(12) United States Patent
Clark et al.

(10) Patent No.: US 7,744,058 B2
(45) Date of Patent: Jun. 29, 2010

(54) ACTUATOR

(75) Inventors: Daniel Clark, Belper (GB); John R Webster, Derby (GB)

(73) Assignee: Rolls-Royce plc, London (GB)

( * ) Notice: Subject to any disclaimer, the term of this patent is extended or adjusted under 35 U.S.C. 154(b) by 798 days.

(21) Appl. No.: 11/544,600

(22) Filed: Oct. 10, 2006

(65) Prior Publication Data

US 2007/0107814 A1    May 17, 2007

(30) Foreign Application Priority Data

Oct. 26, 2005    (GB) ................. 0521810.2

(51) Int. Cl.
*F16K 31/00* (2006.01)
*F16K 31/18* (2006.01)

(52) U.S. Cl. ................... 251/11; 251/129.06
(58) Field of Classification Search ........... 251/11, 251/129.01, 129.06
See application file for complete search history.

(56) References Cited

U.S. PATENT DOCUMENTS

| 4,400,634 | A | * | 8/1983 | Micheron | ................. 307/400 |
|---|---|---|---|---|---|
| 4,405,387 | A | | 9/1983 | Albrecht | |
| 5,619,177 | A | * | 4/1997 | Johnson et al. | ............. 337/140 |
| 6,545,384 | B1 | * | 4/2003 | Pelrine et al. | ............... 310/309 |
| 2005/0166575 | A1 | | 8/2005 | Birch | |

FOREIGN PATENT DOCUMENTS

| GB | 2 024 422 A | 1/1980 |
|---|---|---|
| JP | 2000356557 AB | 12/2000 |
| JP | 2001003850 AB | 1/2001 |

* cited by examiner

*Primary Examiner*—John K Fristoe, Jr.
(74) *Attorney, Agent, or Firm*—Jeffrey S. Melcher; Manelli Denison & Selter PLLC

(57) ABSTRACT

An actuator (12) is disclosed for example controlling gas flow in a gas turbine engine. The actuator (12) comprises a first portion (14) having shape memory properties, and a second portion (16) formed of substantially the same material as the first portion and having reduced shape memory properties relative to the first portion. The first portion (14) is movable from a first position to a second position at a temperature above the phase transition temperature of the shape memory material of the first portion (14). The second portion (16) is arranged to urge the first portion (14) from the second position to the first position at a temperature below the phase transition temperature of the shape memory material.

16 Claims, 4 Drawing Sheets

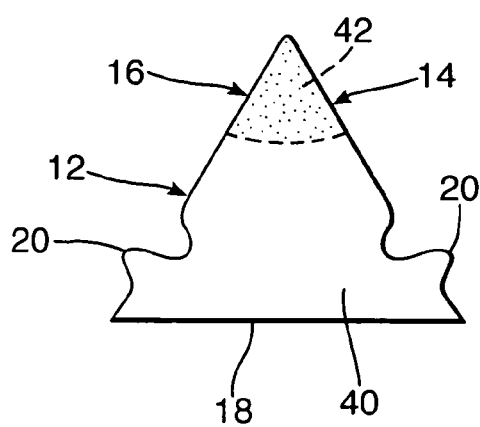
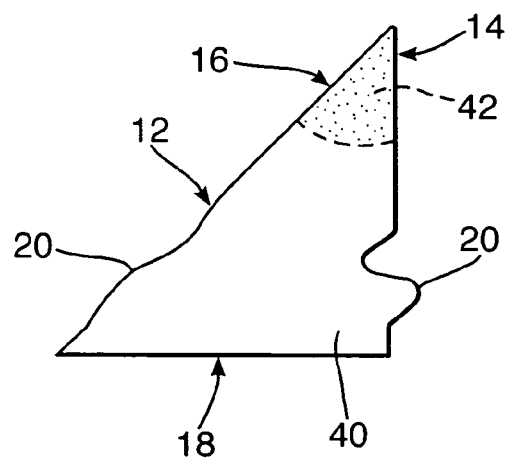
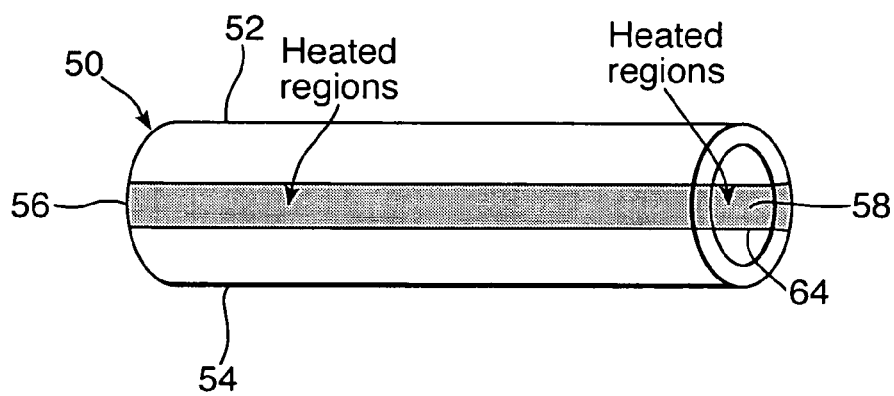
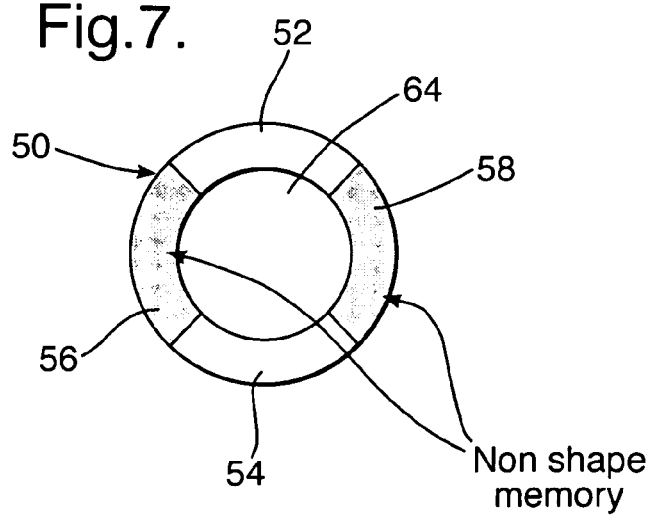

ACTUATOR

BACKGROUND OF THE INVENTION

This invention relates to actuators. More particularly, but not exclusively, the invention relates to actuators formed from shape memory materials.

Gas turbine engines are used to power aircraft. Such engines provide for propulsive power by generating a high velocity stream of gas which is exhausted rearwards through an exhaust nozzle. At various regions throughout the gas turbine engine, it is desirable to be able to control the flow of gas, depending upon the temperature. Known actuators for controlling valves or the like within the engine can be mechanically or electrically operated. Such actuators have this advantage of short lifespan.

SUMMARY OF THE INVENTION

According to one aspect of this invention, there is provided an actuator having a first portion comprising a shape memory material having shape memory properties, and a second portion being devoid of or having reduced shape memory properties relative to the first portion, the first portion being movable from a first position to a second position at a temperature above the phase transition temperature of the shape memory material of the first portion, and the second portion being arranged to urge the first portion from a first condition to a second condition at a temperature below the phrase transition temperature of the shape memory material.

The actuator may be formed as a single piece. The actuator may include a support portion extending between the first and second portions. The first and second portions may be integrally attached to the support portion at first ends of the first and second portions. The first and second portions may include opposite free second ends which can be connected to one another. The connection between the second ends of the first and second portions may be a mechanical connection, such as welding or pinning.

The first and second portions may be formed of substantially the same material as each other. When the first and second portions are formed, both may comprise the shape memory material having shape memory properties. The second portion may be treated to reduce the shape memory properties. Preferably, the second portion is treated to substantially remove the shape memory properties.

The second portion may comprise resilient urging means to urge the first portion to the second condition. In one embodiment, the second portion may comprise spring means.

Each of the first and second portions may comprise an elongate element. The elongate element of the first portion preferably engages or is attached to the elongate element of the second portion at the respective second ends of the first and second portions.

At least one of the first and second portions may comprise a resilient element. Preferably, each of the first and second portions comprises a resilient element. The or each resilient element may comprise a convolution on the respective first or second portion.

Each of the first and second portions may comprise a plurality of elongate elements wherein each elongate element of the first portion engages, or is attached to, a respective one of the elongate elements of the second portion, such attachment may occur at respective second ends of the first and second portions.

According to another aspect of this invention, there is provided a method of forming an actuator, comprising providing a shape memory material capable of having shape memory properties, forming a blank for an actuator, the blank having first and second portions attached to each other from the material, treating in a first treatment stage the first and second portions to provide shape memory properties, treating in a second treatment stage the second portion to reduce or remove the shape memory properties of the shape memory material of the second portion, and connecting opposite ends of the first and second portions to one another.

The step of forming the first and second portions may comprise forming the first and second portions by extrusion or by powder atomisation of the molten alloy, or by hot isostatic pressing of the atomised alloy to form the final product, which may be homogenised.

The shape memory properties of the first and second portions, may be provided in the first treatment stage by heat treatment and/or by hot rolling the first and second portions. The stage of providing the shape memory properties may comprise shape training the first and second portions.

The second treatment stage of reducing the shape memory properties of the second portion may comprise substantially removing the shape memory properties of the shape memory alloy of the second portion. The second treatment stage may comprise heating the second portion. Preferably the stage of heating the second portion includes keeping the first portion cool. Preferably, a flow of a cooling fluid is provided over the first portion to keep it cool.

In one embodiment, the actuator may comprise a tube. A first axially extending region of the tube may constitute the first portion. A second axially extending region of the tube may constitute the second portion. The tube may move between a first position and a second position, when the first portion moves as aforesaid.

The actuator may comprise two first axially extending regions. The actuator may comprise two second axially extending regions. The first axially extending regions may be arranged substantially opposite each other. The second axially extending regions may be arranged substantially opposite each other.

The actuator may comprise a support upon which the tube is mounted.

The actuator may comprise urging means to urge the tube from the second position to the first position. The urging means may comprise a spring.

The first and second portions may be formed of substantially the same material as each other. Said material may be a shape memory material having shape memory properties. The second portion may be treated to reduce, or substantially remove, the shape memory properties.

BRIEF DESCRIPTION OF THE DRAWINGS

Embodiments of the invention will now be described by way of example only, with reference to the accompanying drawings, in which:

FIGS. 5A and 5B are diagrammatic representations of the actuator shown in FIG. 4 in first and second conditions;

FIG. 6 is a side perspective view of a further embodiment of an actuator;

FIG. 7 is an end view of the embodiment shown in FIG. 6;

DETAILED DESCRIPTION OF THE INVENTION

Figure 1:
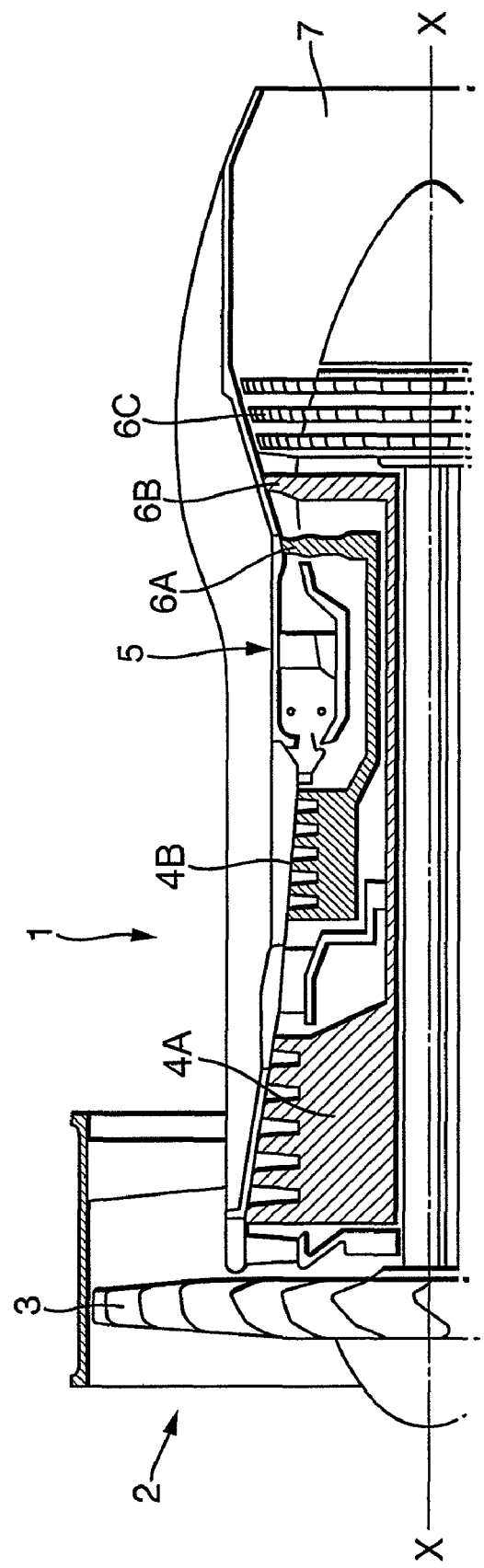
FIG. 1 is a sectional side view of the upper half of a gas turbine engine.
Figure 2:
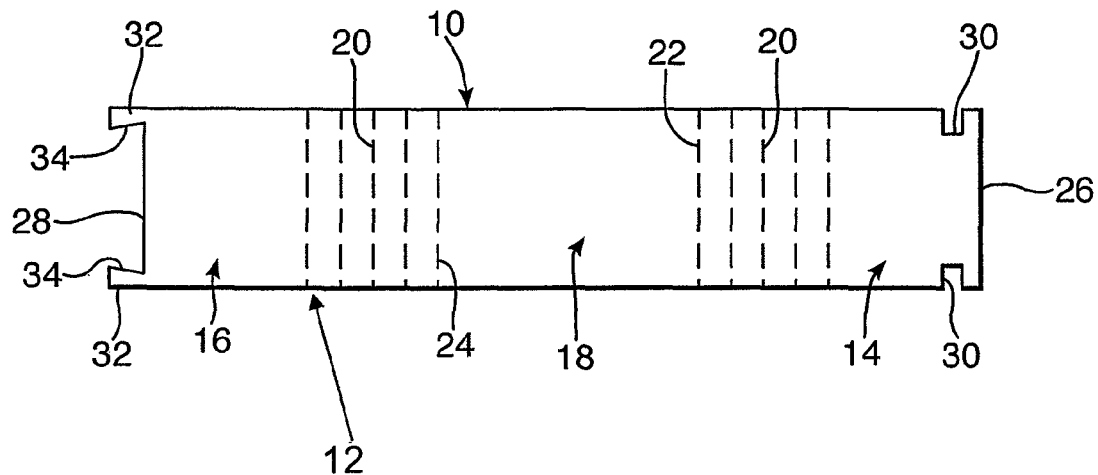
FIG. 2 is a top view of a blank of an actuator prior to being formed into the actuator.
Figure 3:
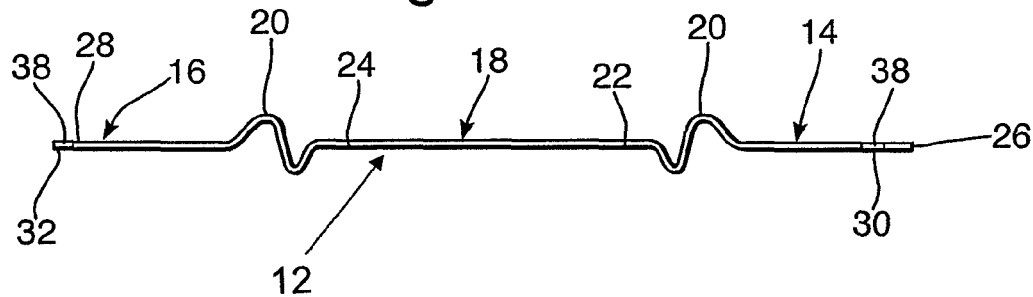
FIG. 3 is a solid view of the blank shown in FIG. 1.

With reference to FIG. 1, a ducted fan gas turbine engine generally indicated at 1 has a principal axis X-X. The engine 1 comprises, in axial flow series, an air intake 2, a propulsive fan 3, an intermediate pressure compressor 4A, a high pressure compressor 4B, combustion equipment 5, a high pressure turbine 6A, an intermediate pressure turbine 6B, a low pressure turbine 6C and an exhaust nozzle 7.

The gas turbine engine 1 works in a conventional manner so that air entering the intake 2 is accelerated by the fan to produce two air flows: a first air flow into the intermediate pressure compressor 4A and a second air flow which provides propulsive thrust. The intermediate pressure compressor 4A compresses the air flow directed into it before delivering that air to the high pressure compressor 4B where further compression takes places.

The compressed air exhausted from the high pressure compressor 4B is directed into the combustion equipment 5 where it is mixed with fuel and the mixture combusted. The resultant hot combustion products then expand through, and thereby drive, the high, intermediate and low pressure turbine, 6A, 6B and 6C before being exhausted through the nozzle 7 to provide additional propulsive thrust. The high, intermediate and low pressure turbines 6A, 6B and 6C respectively drive the high and intermediate pressure compressors 4B and 4A and the fan 3 by suitable interconnecting shafts.

In various regions of the engine shown in FIG. 1, control of the flow of gas is required. FIGS. 2 to 4, 5A and 5B show an actuator 12 for controlling the flow of gas.

Referring to FIGS. 2 to 5B of the drawings, there is shown a blank 10 for an actuator 12, which may be suitable for controlling gas flow in a gas turbine engine. The blank 10 can be folded to form the actuator 12 shown in FIG. 3. The blank 10, and the actuator 12, are formed of a single piece of a shape memory material, such as a nickel-titanium alloy, for example, nitinol. The blank 10 and the actuator 12, comprises a first portion 14, and a second portion 16. A support portion 18 is provided between the first and second portions. The first and second portions 14, 16 are integrally attached to the support portion 18.

The first and second portions 14, 16 are each provided with a resilient element in the form of a corrugation or convolution 20 in the respective first and second portions 14, 16.

Although the first and second portions 14, 16 are part of a single piece of material, for the purpose of this specification, the first portion 14 is deemed to have a first end 22, and the second portion 16 is deemed to have a first end 24. Each of the first and second portions 14, 16 is integrally attached to the support portion 18 at the respective first ends 22, 24.

Figure 4:
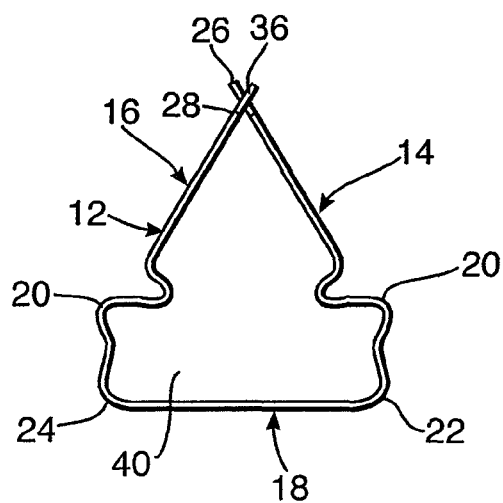
FIG. 4 is an actuator formed from the blank shown in FIGS. 1 and 2.

The first and second portions 14, 16 also have respective free second ends 26, 28 which include cooperating formations 30, 32 to enable the free second ends 26, 28 to be mechanically connected to each other, as shown in FIG. 4. The mechanical connection may be, for example, welding or pinning.

The cooperating formation 30 at the free second end 26 of the first portion 14 includes a pair of opposed notches extending inwardly from opposite side edges of the blank 10. The cooperating formation 32 at the free second end 28 of the second portion 16 comprises lengthwise extending projections 32 having inwardly tapered edges 34. The projections 32 can be received with the notches 30 and the tapered edges 34 engage the inner edges of the notches 30 to prevent the first and second portions 14, 16 disengaging from each other. If desired, a pin 36 can be inserted through the projections 32 via apertures 38 in the projections 32, and in the first portion 14 at the notches 30.

The blank 10 may be formed by any other suitable means known in the art, for example by welding.

Referring to FIGS. 5A and 5B, there are shown diagrammatically, first and second positions between which the actuator 12 can move. FIG. 5A shows a first position, and FIG. 5B shows a second position. As can be seen, in FIG. 5B, the first portion 14 is generally orthogonal to the support portion 18, and the convolution 20 of the second portion 16 is stretched to accommodate the position of the first portion 14. The first position shown in FIG. 5A is similar to that shown in FIG. 4.

The second position shown in FIG. 5B is a position to which the first portion 14 moves at high temperature. As will be explained below, the first portion 14 has shape memory properties, and the second portion 16 is devoid of such shape memory properties. In the first position shown in FIG. 5A, the first portion 14 is in the martensitic phase, and has been moved to its position shown in FIG. 5A by the resilient action of the second portion 16. This is the low temperature condition of the actuator 12. The second portion 16 constitutes a spring to urge the first portion 12 back to its condition shown in FIG. 5B.

In use, the actuator 12 is arranged in the gas stream of a gas turbine engine, for example to operate a valve, flap or other controller to control the flow of hot gases. As explained above, at low temperature, the actuator 12 is in the first position shown in FIG. 5A. During operation of the gas turbine engine, the temperature of the gases increases, until it exceeds the martensitic-austenitic phase transition temperature and the martensitic phase of the first portion 14 changes to an austenitic phase. As this change occurs and the first portion 14 moves to the position shown in FIG. 5B. Since the second end of the first and second portions 14, 16 are connected to each other, the second portion 16 moves to the position shown in FIG. 5B.

As the temperature of the gas flowing over the actuator 12 cools, to below the martensitic-austenitic phase transition temperature, the phase of the first portion 14 changes from austenitic to martensitic, as this happens, the resilient urging properties of the second portion 16 move the first portion 14 back to the first position shown in FIG. 5A.

The procedure for providing the first portion 14 with shape memory alloy properties and the second portion 16 with no shape memory alloy properties is as follows.

The blank 10 can be formed, by any suitable means known in the art, such as by powder atomisation of the molten alloy, or by hot isostatic pressing. After the blank 10 has been formed, it is then folded to form the actuator 12. The actuator 12 is then processed in a first treatment stage to impart shape memory properties to the actuator 12. The process of providing the shape memory properties to the actuator 12 can be by hot rolling, or other suitable technique known in the art.

The process of hot rolling a shape memory material to provide it with shape memory properties is known in the art, but can be summarised as involving rolling the material to a desired shape and heating the material to a high temperature, such as about 500° C. While not wishing to be limited to any particular theory, it is believed that the high temperature cause the atoms to arrange themselves into a highly compact and regular pattern.

After the material of the actuator 12 has been provided with shape memory properties, the second portion 16 is then treated in a second treatment stage to remove the shape memory properties therein.

The second treatment stage involves applying heat to the second portion 16 while at the same time applying a cooling fluid over the first portion 14. In this way, the shape memory properties of the second portion 16 are reduced or removed, but the shape memory properties of the first portion are retained.

The treatment of the second portion 16 during the second treatment stage has the effect of converting the second portion 16 into a constant load spring element thereby enabling it to move the first portion 14 from the second position shown in FIG. 5B to the first position in FIG. 5A to its condition in FIG. 5A when the first portion 14 is in the martensitic phase.

In order to enhance the operation of the second portion 16 in moving the first portion 14 to the first position shown in FIG. 5A, the generally triangular gap 40 can be filled with a stiff foam material, 42 only some of which is shown in FIGS. 5A and 5B. The stiff foam material 42 is compressed when the actuator is in the second position shown in FIG. 5B thereby urging the actuator back to the first condition shown in FIG. 5A. It will be appreciated that, in the preferred embodiment, the whole of the triangular region 40 within the actuator 12 is filled with the stiff foam material 42.

It will be appreciated that the movement between the first and second positions shown in FIG. 5A and 5B respectively can be of the order of a few millimetres.

There is thus described an actuator 12 which can be used in a gas turbine engine, to deploy flaps to mix airstreams of gas which has the advantage of being able to operable directly by a change in temperature of the gas flowing over it. It will be appreciated that the actuator 12 could be used in other applications, for example any region where it is necessary to control the flow of a hot gas. The preferred embodiment also has the advantage that it is a low cost element, and since it is a one piece unit reduces the component count of an engine.

Various modifications can be made without departing from the scope of the invention, for example, the actuator shown in the drawings has only a single first portion, and a single second portion. The actuator could have a plurality of first portions, in the form of fingers, and a plurality of second portions, also in the form of fingers. Where each of the first portion fingers would be mechanically attached to a respective one of the second portion fingers.

A further modification is shown in FIGS. 6 to 9. FIG. 6 shows a side perspective view of a cylindrical tube 50 having two shape memory regions 52, 54 extending lengthwise of the tube 50, opposite each other. The tube 50 also includes two non-shape memory regions 56, 58 extending lengthwise of the tube 50, opposite each other.

FIG. 7 is an end view of the tube 50 shown in FIG. 6, showing the arrangement of the shape memory regions 52, 54 and the non-shape memory regions 56, 58.

Figure 8:
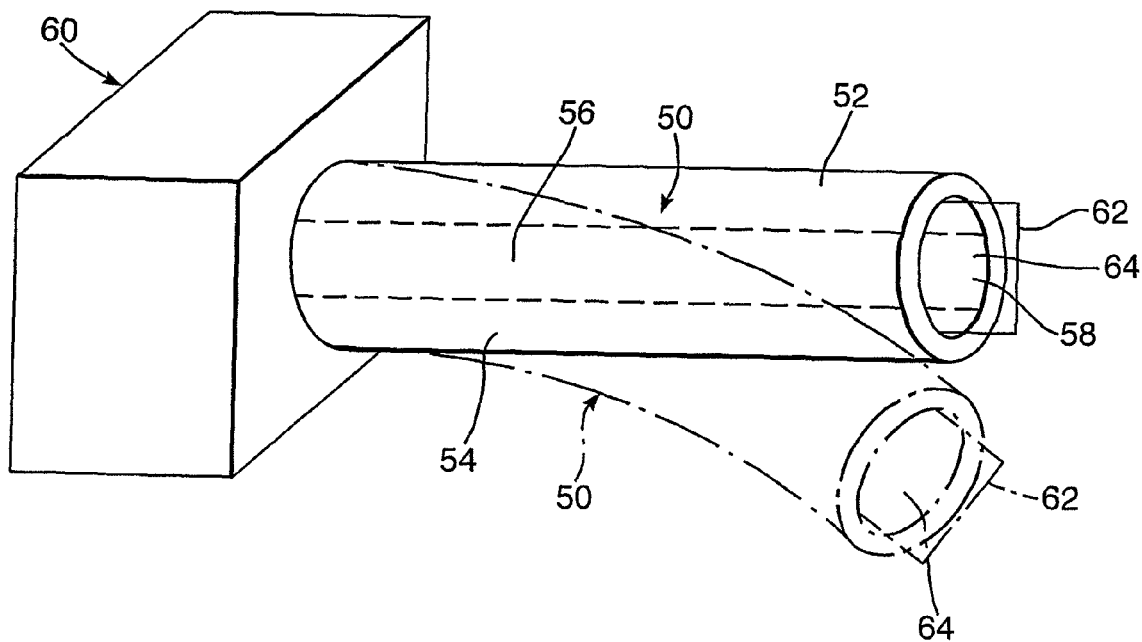
FIG. 8 is a side perspective view of the embodiment shown in FIG. 6 in use.

FIG. 8 shows an example of the use of the shape memory tube 50. In FIG. 8, the tube 50 is mounted on a support 60, for example, inside a gas turbine engine.

At low temperatures, with the shape memory material e.g. Nitinol, in the martensitic phase, the tube 50 assumes the position shown in solid lines in FIG. 8. As the temperature increases to above the martensitic/austenite phase temperature the nitinol forming the tube 50 changes to the austenitic phase and the tube 50 moves to the position show in broken lines in FIG. 8.

As the temperature cools to below the martensite/austenite phase transition temperature, the nitinol changes to the martensitic phase and the tube 50 moves to the position shown in solid lines in FIG. 8.

Urging means in the form of a spring 62 (shown schematically in FIG. 8) applies a force to the tube 50 to help return it to the position shown in solid lines in FIG. 8.

The shape memory regions 52, 54 of the tube 50 are provided at upper and lower portions of the tube 50. The non-shape memory regions 56, 58 are provided at lateral portions of the tube 50. As shown in FIG. 8, the non-shape memory regions 56, 58 extend along opposite lateral portions of the tube 50. The non-shape memory regions 56, 58 are, as shown, provide along the neutral bending axis. The non-shape memory regions 56, 58 act to urge the tube 50 from the position shown in broken lines in FIG. 8 to the position shown in solid lines.

Figure 9:
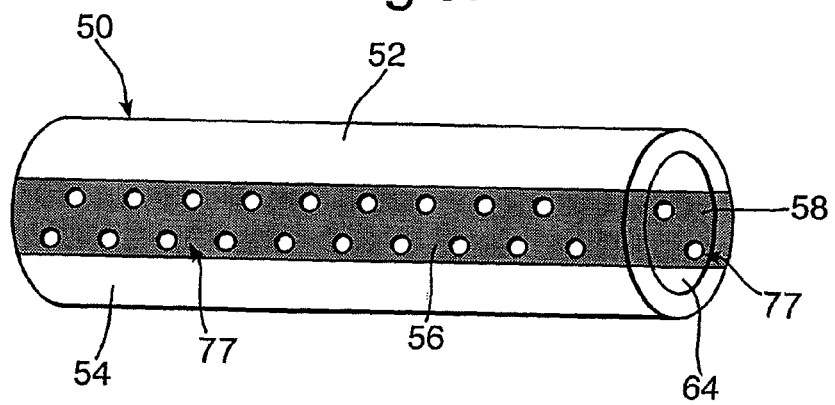
FIG. 9 is a side perspective view of another version of the embodiment shown in FIG. 6.

FIG. 9 shows a further embodiment of the tube 50 which includes all the features shown in FIGS. 6 to 8 and these have been designated with the same reference numerals as in FIGS. 6 to 8. The embodiment shown in FIG. 9 differs from the embodiment shown in FIGS. 6 to 8 in that an array 77 of through apertures are provided in the non-shape memory regions 56, 58.

The array 77 of apertures is provided for weight saving purposes, and to enhance heat transfer.

The tube 50 shown in FIGS. 6 to 9 has a bore 64 that is centrally defined therethrough. The bore 64 could be off-centre, if desired.

The embodiments shown above could be in the form of catches to secure or release a further article (not shown). At low temperatures (for example) the actuator could engage the article to secure it in place. At higher temperatures above the martensite/austenite phase transition temperatures, the actuator could move away from the article to release it.

In the embodiment shown in FIGS. 2 to 5B, the shape memory and non-shape memory portions are provided with corrugations or convolutions 20. If desired, the corrugations in the first, shape memory portion 14 could be provided only in one phase e.g. the austenitic phase. Corrugations increase stiffness in a sheet, thus by providing corrugations in one phase only, the stiffness in that phase is increased. This leads to greater force in one direction.

In another embodiment, the actuator could be in the form of an I-beam or an H-beam, having outer flanges and a centre support. The outer flanges could be formed of a shape memory material and the support portion could be formed of a non-shape memory material.

We claim:

1. An actuator having first and second portions formed of substantially the same material as each other, said material being a shape memory material having shape memory properties, the second portion being treated to reduce the shape memory properties relative to the first portion, the first portion being movable from a first position to a second position at a temperature above the phase transition temperature of the shape memory material of the first portion, and the second portion being arranged to urge the first portion from the second portion to the first position at a temperature below the phase transition temperature of the shape memory material.

2. An actuator according to claim 1 wherein the actuator is formed as a single piece, and includes a support portion extending between the first and second portions, the first and second portions being integrally attached to the support portion at first ends of the first and second portions.

3. An actuator according to claim 1 wherein the first and second portions are each part of a single piece of the material.

4. An actuator according to claim 1 wherein the second portion is treated to substantially remove the shape memory properties.

5. An actuator according to claim 1 wherein the second portion may comprise resilient urging means to urge the first portion to the first position.

6. An actuator according to claim 1 wherein at least one of the first and second portions includes a resilient element, the resilient element comprising a convolution in the respective first and/or second position.

7. An actuator according to claim 6 wherein each of the first and second portions includes an aforesaid resilient element.

8. An actuator according to claim 1 wherein each of the first and second portions comprises a plurality of elongate elements wherein each elongate element of the first portion engages or is attached to a respective one of the elongate elements of the second portion.

9. An actuator having first and second portions formed of substantially the same material as each other, said material being a shape memory material having shape memory properties, the second portion being treated to reduce the shape memory properties relative to the first portion, the first portion being movable from a first position to a second position at a temperature above the phase transition temperature of the shape memory material of the first portion, and the second portion being arranged to urge the first portion from the second portion to the first position at a temperature below the phase transition temperature of the shape memory material, said actuator comprising a tube, wherein a first axially extending region of the tube constitutes the first portion, and a second axially extending region of the tube constitutes the second portion, wherein the tube moves between a first position and a second position when the first portion moves as aforesaid.

10. An actuator according to claim 9 comprising two first axially extending regions, and two second axially extending regions, the first axially extending regions being arranged opposite each other, and the second axially extending regions being arranged opposite each other.

11. An actuator according to claim 9 comprising a support upon which the tube is mounted.

12. An actuator according to claim 9 including urging means to urge the tube from the second position to the first position.

13. An actuator according to claim 12 wherein the urging means comprises a spring.

14. An actuator according to claim 9 wherein the second portion is treated to substantially remove the shape memory properties.

15. An actuator having first and second portions formed of substantially the same material as each other, said material being a shape memory material having shape memory properties, the second portion being treated to reduce the shape memory properties relative to the first portion, the first portion being movable from a first position to a second position at a temperature above the phase transition temperature of the shape memory material of the first portion, and the second portion being arranged to urge the first portion from the second portion to the first position at a temperature below the phase transition temperature of the shape memory material, wherein the actuator is formed as a single piece, and includes a support portion extending between the first and second portions, the first and second portions being integrally attached to the support portion at first ends of the first and second portions, and wherein the first and second portions include opposite free second ends which can be connected to one another.

16. An actuator according to claim 15 wherein each of the first and second portions comprises an elongate element, the elongate element of the first portion engages or is attached to the elongate element of the second portion at the respective second ends of the first and second portions.

* * * * *